United States Patent [19]
Kaneko et al.

[11] 3,912,658
[45] Oct. 14, 1975

[54] FIBER IMPREGNATED REINFORCED CATALYST CARRIER AND A PROCESS FOR THE PRODUCTION THEREOF

[75] Inventors: Yasuhisa Kaneko; Fumiyoshi Noda, both of Toyota, Japan

[73] Assignee: Toyota Jidosha Kogyo Kabushiki Kaisha, Toyota, Japan

[22] Filed: Apr. 30, 1973

[21] Appl. No.: 355,429

[30] Foreign Application Priority Data
May 4, 1972 Japan.................................. 47-44469

[52] U.S. Cl............. 252/455 R; 252/463; 423/212; 423/213
[51] Int. Cl.² ...................... B01J 29/06; B01J 23/08
[58] Field of Search......................... 252/455 R, 463

[56] References Cited
UNITED STATES PATENTS
| | | | |
|---|---|---|---|
| 3,125,539 | 3/1964 | Teague............................ | 252/455 R |
| 3,288,615 | 11/1966 | Estes et al.................... | 252/455 R X |
| 3,562,184 | 2/1971 | Dodd et al. ...................... | 252/455 R |

*Primary Examiner*—Paul F. Shaver
*Attorney, Agent, or Firm*—Stevens, Davis, Miller & Mosher

[57] ABSTRACT

A fiber-impregnated reinforced catalyst carrier and a process for the production thereof, which process comprises mixing ceramic fibers to pulverulent alumina, moulding the mixture to the desired shape under addition of water and a suitable organic solvent, curing the moulded product for one hour so that the moisture may not be removed therefrom, and drying and calcining the moulded and cured product.

2 Claims, No Drawings

FIBER IMPREGNATED REINFORCED CATALYST CARRIER AND A PROCESS FOR THE PRODUCTION THEREOF

BACKGROUND OF THE INVENTION

Ceramic material in the shape of pills or pellets or in a monolithic structure is used as a carrier for a catalyst intended for cleaning the exhaust gas of automotive vehicles. The catalyst carrier of this type has a drawback in that it is readily worn out and destroyed under vibrations with rapid reduction in the cleaning performance and thus can not be used for a prolonged time.

SUMMARY OF THE INVENTION

The present invention relates to a carrier for a catalyst used for cleaning exhaust gas of automotive vehicles. The catalyst carrier according to the present invention is reinforced by ceramic fibers dispersed therein, with a view in improving its vibration-resistant properties.

DETAILED DESCRIPTION OF THE INVENTION

This invention relates to a catalyst carrier reinforced with ceramic fibers thus having a markedly improved resistance to vibration.

More particularly, various pulverulent ceramic material used conventionally as catalyst material, such as alumina, mullite and cordierite, can be used as ceramic material.

On the other hand, the ceramic fibers of $Al_2O_3$—$SiO_2$ or $ZnO_2$, that do not lower the catalytic property of the catalyst, may be used as ceramic fibers that are added for the purpose of reinforcing the catalyst material. Preferably, the ceramic fibers may be in the range of 1 to 10 $\mu$ in diameter and about 1 to 3 mm in length, with consideration that these fibers are subjected to the mixing and granulating steps, and the granulated product must have sufficient strength. The quantity of addition of the ceramic fibers differs with the pulverulent ceramic material and the ceramic fibers used and may preferably be in the order of 2 to 5 percent.

The uniform mixture of the pulverulent ceramic material and the ceramic fibers may then be moulded, dried and calcined in the conventional manner for producing the fiber-reinforced catalyst carrier in granulated form.

The advantages to be accrued from the present invention are such that the compaction density can be lowered without any marked reduction in the compression resistance, that the catalyst layer can be speedily heated to a temperature of catalytic activity owing to the lowered compaction density and that the breaking strength and vibration resistance of the catalyst carrier can be markedly improved.

EXAMPLE 1

2 percent of ceramic fibers, the properties of which are tabulated in Table 2, were added to $\rho$-alumina powders, the properties of which are tabulated in Table 1, and the thus obtained product was mixed for 10 hours in a powder mixer. The mixture was then granulated by a pan-typed granulator. The granulating step was carried out in such a way that the $\rho$-alumina powders added with the above mentioned ceramic fibers were introduced gradually into a pan (i.e. a flat saucer), which was revolved at 17 to 22 r.p.m., while water was sprinkled in a mist over the mixture. This operation was carried out for 17 minutes and the pill-like p-alumina having the diameter of 3 to 6 mm and added with ceramic fibers was obtained.

The thus obtained pill-like $\rho$-alumina added with the ceramic fibers was charged into a vinyl bag and allowed to stand for 3 hours for curing. The pill-like material was then dried at 110°C for 15 hours and then calcined at 700°C for 2 hours to obtain the catalyst carrier.

Table 3 shows the properties of the pill-like catalyst carried produced, from usual $\rho$-alumina powders not impregnated with the ceramic fibers, in the same way as above, and those of the catalyst carrier produced in accordance with the present Example. It is seen from this Table that the surface area of the inventive product is somewhat reduced as compared to the conventional one, but there is not much difference between the two in respect of compression strength. The inventive product has the compaction density smaller than that of the conventional one by approximately 0.15g/cm$^3$. The various properties of the two products were measured in the two kinds of calcined products having diameters of 3.0 to 4.0 mm and 4.0 to 5.0 mm, respectively.

Table 1

| | Properties of $\rho$-alumina | |
|---|---|---|
| | item | measured values |
| Chemical composition | Ig loss | 5.2% |
| | Na$_2$O | 0.2% |
| | Fe$_2$O$_3$ | 0.03% |
| | SiO$_2$ | 0.02% |
| | Al$_2$O$_3$ | 94.5% |
| real specific weight | | 3.1 |
| surface area | | 350 m$^2$/g |
| average particle size | | 12 $\mu$ |

Table 2

| | Properties of ceramic fibers | |
|---|---|---|
| | item | measured values |
| Chemical composition | Al$_2$O$_3$ | 60.2% |
| | SiO$_2$ | 38.7% |
| | Fe$_2$O$_3$ | 0.2% |
| | TiO$_2$ | 0.2% |
| | CaO | 0.1% |
| | MgO | 0.1% |
| | Na$_2$O | 0.4% |
| fiber diameter (average) | | 2.3$\mu$ |
| fiber length (average) | | 1.8 mm |
| real specific weight | | 2.6 g/cm$^3$ |

Table 3

Various properties of the inventive and conventional products

| sample | | diameter | bulk density (10 ea average g/cm$^3$) | compaction density (g/cm$^3$) | compression strength (measured of 30 samples) | surface area (m$^2$/g) |
|---|---|---|---|---|---|---|
| conventional | No. 1 | 3.0–4.0 | 1.79 | 0.80 | 9.3–12.2 | 218 |

Table 3 — Continued

| sample | | diameter | bulk density (10 ea average g/cm³) | compaction density (g/cm³) | compression strength (measured of 30 samples) | surface area (m²/g) |
|---|---|---|---|---|---|---|
| | No. 2 | 4.0–5.0 | 1.80 | 0.78 | 9.1–13.0 | 225 |
| inventive | No. 3 | 3.0–4.0 | 1.66 | 0.60 | 8.7–12.4 | 190 |
| | No. 4 | 4.0–5.0 | 1.65 | 0.59 | 8.8–12.1 | 178 |

TEST EXAMPLE 1

To check for strength of the material, a test piece in the form of a bar 10 × 10 × 30 mm was prepared and checked for its breaking strength.

The above test piece was prepared in such a way that 2 percent of ceramic fibers (see Table 2) was added to $\rho$-alumina powders in the same manner as in Example 1, the product thus obtained was mixed in a powder mixer for 10 hours, the resulting mixture was added with 10 wt. percent of water and agitated for 30 minutes and the mixture was finally press-worked in a die to the above-mentioned shape. The press pressure amounted to 200 kg/cm². The subsequent steps of curing, drying and calcination were the same as in Example 1.

A comparative test piece consisting only of $\rho$-alumina and not containing ceramic fibers was also produced in the same manner as above through the steps of curing, drying and calcination.

The breaking strengths bending strengths of the test pieces produced in this way are shown in Table 4.

Table 4

| item sample | Breaking strength conventional (kg/cm²) | | | | |
|---|---|---|---|---|---|
| | 1 | 2 | 3 | 4 | average |
| conventional | 4.1 | 2.5 | 3.8 | 4.3 | 3.7 |
| inventive | 7.2 | 8.6 | 9.3 | 8.8 | 8.5 |

It is seen from this Table 4 that the breaking strength of the inventive product was markedly superior to that of the conventional one.

TEST EXAMPLE 2

A durability test was carried out on the inventive catalyst carrier product No. 3 produced in accordance with Example 1 and the conventional catalyst carrier product No. 1. The test conditions were such that the catalyst carrier was packed within a catalyst muffler and actually mounted on a vehicle. After running the vehicle 800 km under adverse road conditions, the sum of wear and destruction percentages was checked.

Table 5 shows the results of the test. It is seen from Table 5 that the durability or vibration resistance of the inventive product is markedly superior to that of the conventional one.

Table 5

| sample | item | Test Result the sum of wear and destruction percentages (percents) |
|---|---|---|
| conventional | No. 1 | 21.7 |
| inventive | No. 3 | 9.3 |

EXAMPLE 2

5 percent of ceramic fibers, the properties of which are tabulated in Table 7, was added to $\gamma$-alumina powders, the properties of which are tabulated in Table 6, and the thus obtained product was mixed for 10 hours in a powder mixer as in Example 1. The mixture thus obtained was then granulated by a pan-type granulator. The granulating procedure was carried out in such a manner that the $\gamma$-alumina powders added with the above-mentioned ceramic fibers were introduced gradually into a pan (i.e. a flat sauce pan), which was then revolved at 17 to 22 r.p.m., while water was sprinkled in a mist over the mixture. This operation was carried out for 20 minutes to obtain pill-like $\gamma$-alumina having the diameter of 3.4 to 4.8 mm and added with the ceramic powders. The granulated product thus obtained was dried at 65°C for 50 hours and calcined at 800°C for 2 hours for obtaining the fiber-impregnated pill-like catalyst carrier.

Table 6

| | Various properties of $\gamma$-alumina item | measured values |
|---|---|---|
| chemical composition | Ig loss | 5.0% |
| | $Al_2O_3$ | 94.7% |
| | $Fe_2O_3$ | 0.03% |
| | $SiO_2$ | 0.07% |
| | $Na_2O$ | 0.20% |
| true specific density | | 3.0–3.3 |
| surface area | | 250–350 m²/g |
| average particle size | | 13 $\mu$ |

Table 7

Various properties of ceramic fibers

| item | | measured values |
|---|---|---|
| chemical composition | $Al_2O_3$ | 45.1 % |
| | $SiO_2$ | 51.9 % |
| | $Fe_2O_3$ | 1.3% |
| | $TiO_2$ | 1.7 % |
| | CaO | tr |
| | MgO | tr |
| | $Na_2O$ | tr |
| | $B_2O_3$ | tr |
| fiber diameter (average) | | 2.4 μ |
| fiber length (average) | | 2.1 mm |
| true specific density | | 2.6 g/cm³ |

Table 8 shows the properties of the pill-like catalyst carrier produced from the usual γ-alumina powders not impregnated with ceramic fibers in the same manner as above and those of the catalyst carrier produced in accordance with the present Example. It is seen from this Table that the surface area of the inventive product is somewhat reduced as compared with the conventional one, but there is not much difference between the two in respect to compression strength. The inventive product has the compaction density smaller than that of the conventional one by approximately 20 percent. The various properties of the two products were measured of two kinds of calcined products of diameters 3.0 to 4.0 mm and 4.0 to 5.0 mm, respectively.

Table 8

Various properties of the inventive and conventional products

| sample | item | diameter (mm) | bulk density (g/cm³, an average of ten test pieces) | compaction density (g/cm³) | compression strength (kg, an average of ten test pieces) | surface area (m²/g) |
|---|---|---|---|---|---|---|
| conventional | No.5 | 3.5–4.0 | 1.74 | 0.79 | 9.5–13.7 | 172 |
| | No.6 | 4.0–4.5 | 1.70 | 0.77 | 9.1–13.3 | 185 |
| inventive | No.7 | 3.5–4.0 | 1.61 | 0.54 | 8.8–12.6 | 164 |
| | No.8 | 4.0–4.5 | 1.58 | 0.51 | 8.4–11.8 | 159 |

TEST EXAMPLE 3

A durability test was carried out on the inventive product No. 7 and the conventional product No. 5. The test conditions were such that the catalyst carrier was packed within a catalyst muffler as in Test Example 2 and actually mounted on a vehicle. After running the vehicle 1000 miles under adverse road conditions, the sum of wear and destruction percentages was checked.

The result of the measurement is tabulated in Table 9.

Table 9

| sample | item | Test result sum of wear and destruction percentages (percent) |
|---|---|---|
| conventional | No. 5 | 23.3 |
| inventive | No. 7 | 8.7 |

It is seen from this Table 9, that the vibration resistance of the inventive article is markedly superior to that of the comparative one.

EXAMPLE 3

3 percent of ceramic fibers, the properties of which are tabulated in Table 11, were added to cordierite powders, the properties of which are tabulated in Table 10, and the obtained product was mixed for 10 hours in a powder mixer and thereafter the mixture was granulated by a pan-type granulator in the same manner as in Example 1. The granulating step was carried out in such a way that said cordierite powders added with the above-mentioned fibers were gradually introduced into a pan (i.e., flat saucer), which was revolved at 17 to 22 r.p.m, while 5 percent aqueous solution of polyvinyl alcohol was sprinkled in a mist over said mixture. This operation was continued for 20 minutes to granulate cordierite pills having a diameter of 3.0 to 3.5 mm and added with ceramic fibers. Thereafter, this obtained pills were dried at 65°C for 10 hours and then, calcined at 1250°C for 3 hours thereby producing pill-like catalyst carriers impregnated with ceramic fibers.

Table 12 shows the properties of the pill-like catalyst carries which were produced, from conventional cordierite powders not impregnated with ceramic fibers, in the same manner as above.

From the above Table, it is seen that the invented product decreases in compact density, while improving in compression strength in comparison with the conventional one.

Table 10

| item | | properties |
|---|---|---|
| Chemical Composition | MgO | 13.2% |
| | $Al_2O_3$ | 36.0% |
| | $SiO_2$ | 49.2% |
| | $Fe_2O_3$ | 0.6% |
| | CaO | 0.7% |
| | $Na_2O$ | 0.1% |
| | $K_2O$ | 0.2% |
| real density | | 2.53 g/cm³ |
| average particle size | | 5 μ |
| surface area | | <1 m²/g |

Table 11

| item | | properties |
|---|---|---|
| Chemical Composition | $ZrO_2$ +$HfO_2$ +$Y_2O_3$ | more than 99% |

Table 11—Continued

| item | properties |
| --- | --- |
| fiber diameter | 4~6 μ |
| real density | 5.9 g/cm³ |
| surface area | <1 m²/g |
| fiber length | <2 mm |

Table 12

| sample | item | diameter (mm) | bulk density (per 10) (g/cm³) | compaction density (g/cm³) | compression strength (per 10)$_{kg}$ | surface area m²/g |
| --- | --- | --- | --- | --- | --- | --- |
| Conventional | No.9 | 3.5~4.0 | 1.93 | 0.83 | 10.3~19.2 | <1 |
| | No.10 | 4.0~4.5 | 1.96 | 0.82 | 9.5~16.3 | <1 |
| invention | No.11 | 3.5~4.0 | 1.77 | 0.72 | 12.3~20.5 | <1 |
| | No.12 | 4.0~4.5 | 1.83 | 0.77 | 14.5~22.3 | <1 |

TEST EXAMPLE 4

The catalyst carriers produced according to Example 3 were filed within a catalyst muffler and actually mounted on a vehicle. After running the vehicle 1,000km under adverse road conditions, the sum of wear and destruction ratio was evaluated. The inventive product (1.7%) was much lower than a conventional one (8.8%).

EXAMPLE 4

3 percent of zirconium ceramic fibers, the properties of which are summarized in Table 11, were added to murite powders, the properties of which are summarized in Table 13, and the obtained product was mixed for 10 hours in a powder mixer and thereafter, the mixture was granulated by a pan-type granulator in the same manner as in Example 1. The granulating step was carried out in such a manner that said murite powders added with the above-mentioned ceramic fibers were gradually introduced into a flat saucer, which was revolved at 17 to 22 r.p.m, while 5 percent aqueous solution of polyvinyl alcohol was sprinkled in a misty form over the mixture. This operation was continued for 15 minutes to granulate murite pills having a diameter of 2.5 to 3.3mm and impregnated with said ceramic fibers. Thereafter, these obtained pills were dried at 60°C for 10 hours and then calcined at 1360°C for 3 hours thereby producing pill-like catalyst carriers impregnated with said ceramic fibers.

Table 14 shows the properties of the pill-like catalyst carriers which were produced, from conventional murite powders not impregnated with ceramic fibers, in the same manner as above.

From this Table, it is seen that the inventive catalyst diminishes in compact density, while improving in compression strength.

TEST EXAMPLE 5

The catalyst carriers produced according to Example 4 were filled within a catalyst muffler and actually mounted on a vehicle. After running the vehicle 1,000km under adverse road conditions, the sum of wear and destruction ratio was evaluated. It is seen, from these results, that the inventive produce is 1.2 percent and a conventional one is 11.2 percent. Thus, the invented product is for more superior than a conventional one.

Table 13

| item | properties |
| --- | --- |
| $Al_2O_3$ | 68.73% |
| $SiO_2$ | 29.34% |
| $Fe_2O_2$ | 0.42% |
| $TiO_2$ | 0.62% |
| CuO | 0.28% |
| MgO | 0.28% |
| $NO_2O$ | 0.33% |
| real density | 3.02 g/m³ |
| average particle size | 5 μ |
| surface area | <1 |

Table 14

| sample | item | diameter (mm) | bulk density (per 10) (g/cm³) | compaction density (g/cm³) | compression strength (per 10) | surface area m²/g kg |
| --- | --- | --- | --- | --- | --- | --- |
| conventional | No.13 | 3.5~4.0 | 1.94 | 0.91 | 13.5~17.7 | <1 |
| | No.14 | 4.0~4.5 | 1.97 | 0.87 | 14.6~20.5 | <1 |
| invention | No.15 | 3.5~4.0 | 1.88 | 0.82 | 16.3~20.5 | <1 |
| | No.16 | 4.0~4.5 | 1.87 | 0.79 | 15.2~19.3 | <1 |

What is claimed is:

1. A fiber-impregnated reinforced catalyst carrier characterized in that ceramic fibers of $Al_2O_3$—$SiO_2$ or $ZrO_2$ having a diameter of 1 to 10μ and a length of 1 to 3 mm are dispersed in the ceramic catalyst carrier material in the amount of 2–5 weight percent.

2. The ceramic catalyst carrier of claim 1, wherein said ceramic catalyst material is ρ-alumina, γ-alumina, cordierite or mullite.

* * * * *